US006742793B2

(12) United States Patent
Henriksen et al.

(10) Patent No.: US 6,742,793 B2
(45) Date of Patent: Jun. 1, 2004

(54) VEHICLE STEP

(75) Inventors: Gary R. Henriksen, Lakeville, MN (US); Todd W. Slawson, Eden Prairie, MN (US); Aaron P. Schmidt, Maple Grove, MN (US); Timothy A. Moore, Park Rapids, MN (US)

(73) Assignee: JMX, Inc., Minneapolis, MN (US)

( * ) Notice: Subject to any disclaimer, the term of this patent is extended or adjusted under 35 U.S.C. 154(b) by 43 days.

(21) Appl. No.: 10/229,455

(22) Filed: Aug. 28, 2002

(65) Prior Publication Data

US 2004/0041363 A1 Mar. 4, 2004

(51) Int. Cl.$^7$ ................................................ B60R 3/00
(52) U.S. Cl. ........................................ 280/163; 280/169
(58) Field of Search ............................. 280/163, 164.1, 280/166, 169; 296/183, 62, 75

(56) References Cited

U.S. PATENT DOCUMENTS

| | | | | |
|---|---|---|---|---|
| 3,561,786 A | * | 2/1971 | Lentz | 280/166 |
| 4,203,611 A | * | 5/1980 | Makela | 280/163 |
| 4,451,063 A | * | 5/1984 | Snyder | 280/163 |
| 4,456,275 A | * | 6/1984 | Snyder et al. | 280/163 |
| 4,935,638 A | | 6/1990 | Straka | 280/164.1 |
| 4,943,085 A | | 7/1990 | Straka | 280/770 |
| 4,982,974 A | * | 1/1991 | Guidry | 280/164.2 |
| 5,193,829 A | * | 3/1993 | Holloway et al. | 280/163 |
| 5,286,049 A | * | 2/1994 | Khan | 280/163 |
| 5,382,035 A | * | 1/1995 | Waddington et al. | 280/169 |
| 5,501,475 A | * | 3/1996 | Bundy | 280/166 |
| 5,601,300 A | * | 2/1997 | Fink et al. | 280/166 |
| 5,713,589 A | | 2/1998 | Delgado et al. | 280/163 |
| 5,769,439 A | * | 6/1998 | Thompson | 280/163 |
| 5,799,962 A | * | 9/1998 | Barnhart | 280/166 |
| 5,823,553 A | * | 10/1998 | Thompson | 280/164.1 |
| 5,895,064 A | * | 4/1999 | Laubach | 280/163 |
| 6,173,979 B1 | | 1/2001 | Bernard | 280/163 |
| 6,409,193 B2 | | 6/2002 | Bernard | 280/163 |

OTHER PUBLICATIONS

Advertising for Grissly 4000 Series Diamond Step Pad.
Brochure: Westin New Products for 2002, Westin Automotive Products, Inc.

* cited by examiner

Primary Examiner—Brian L. Johnson
Assistant Examiner—Bridget Avery
(74) Attorney, Agent, or Firm—Vidas, Arrett & Steinkraus, P.A.

(57) ABSTRACT

A step assembly for use on a vehicle comprises an elongate step support member, at least one mounting bracket and at least one brace. The support member defines a top side having a substantially flat surface. The at least one mounting bracket has a base and a pair of arms extending therefrom. The base is constructed and arranged to engage a portion of a vehicle. The at least one brace comprises a first end region and a second end region. The first end region is adjustably and removably engaged to the elongate step support member. The second end region is adjustably and removably engaged to the pair of arms of the at least one mounting bracket.

41 Claims, 9 Drawing Sheets

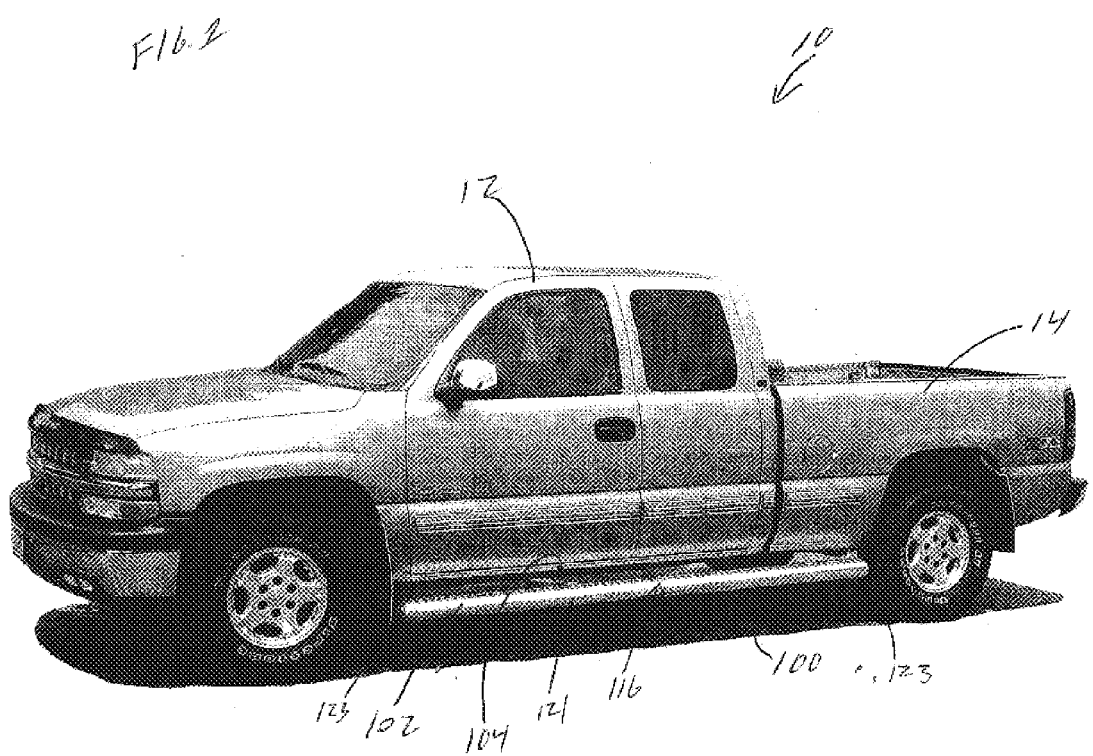

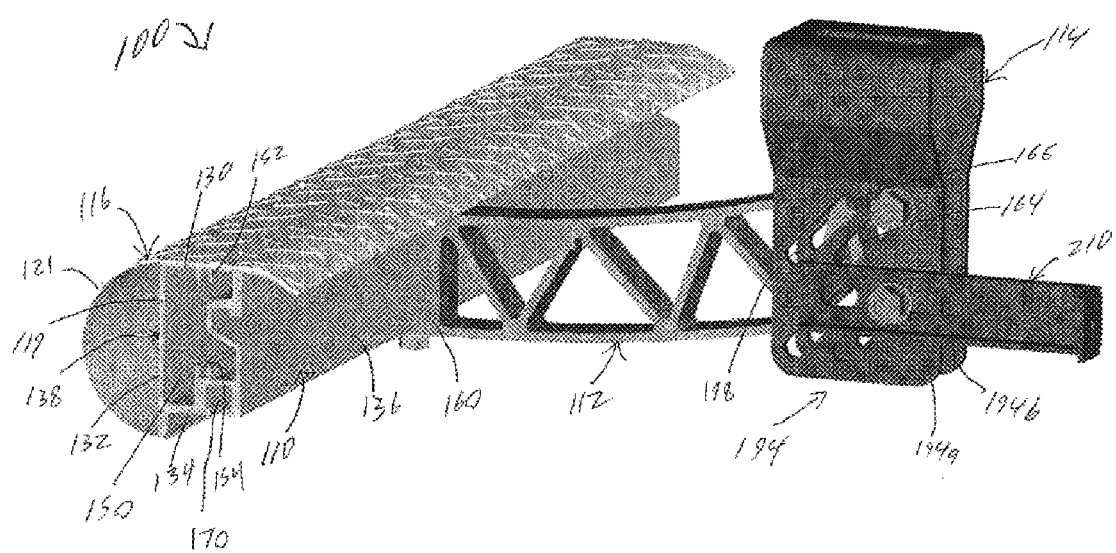

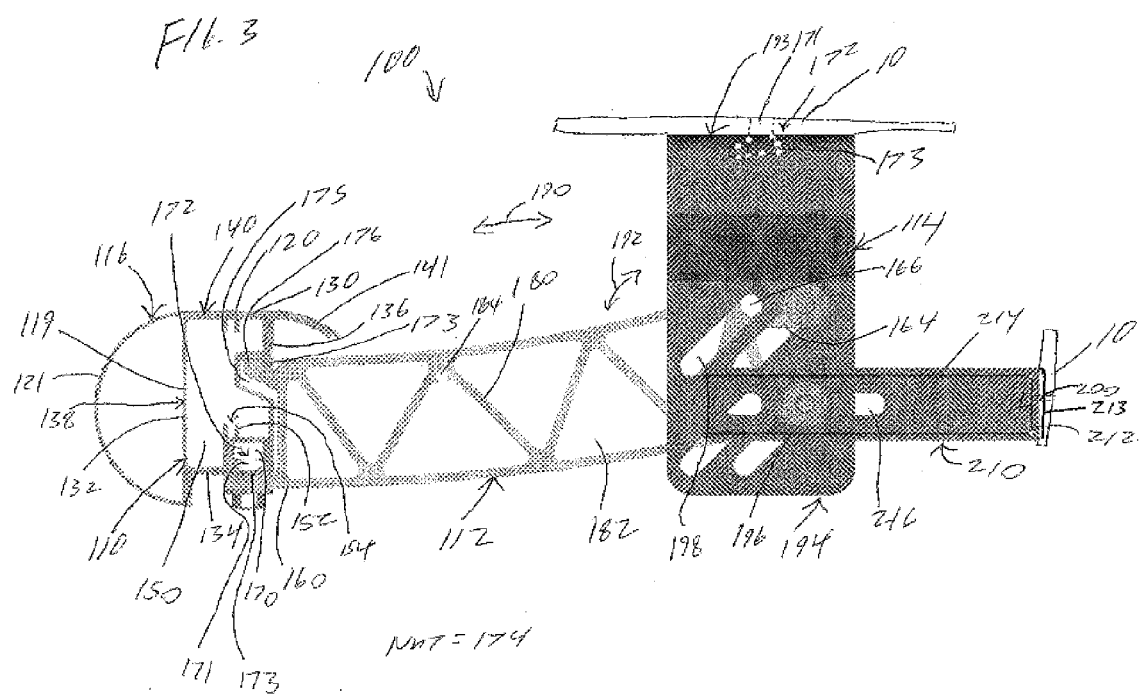

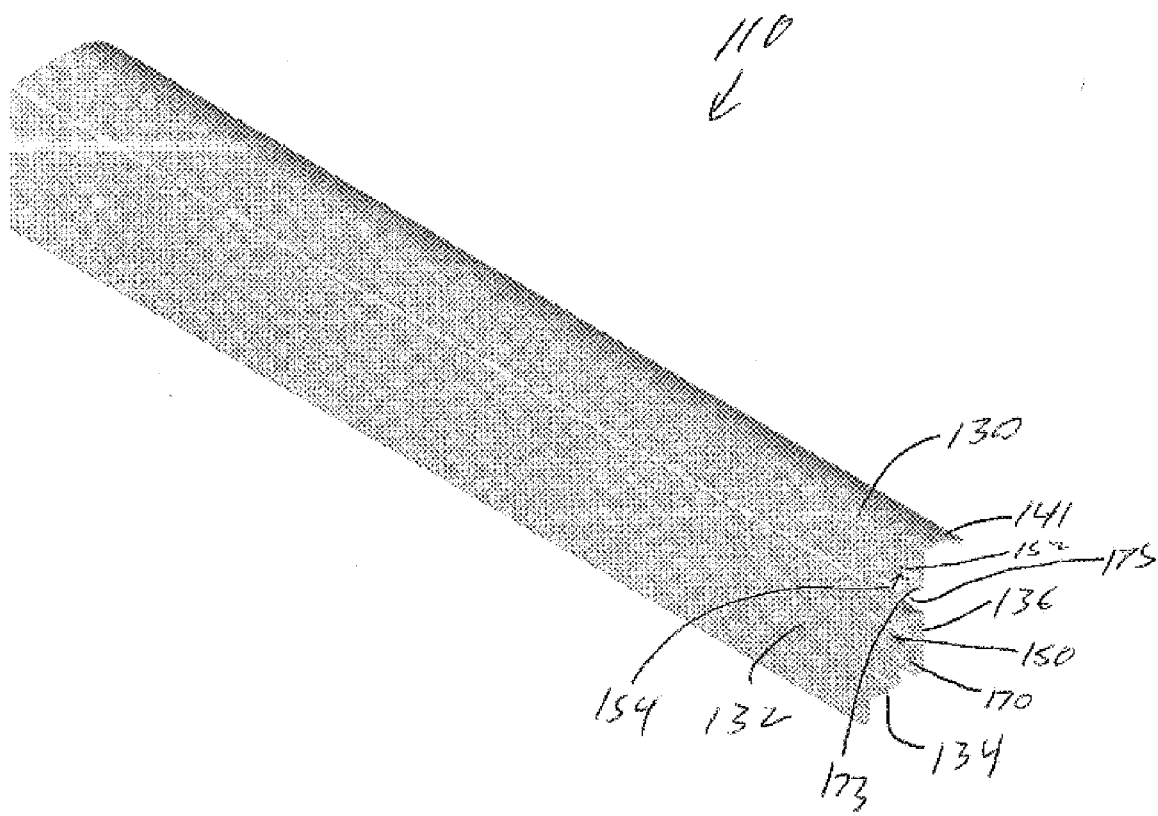

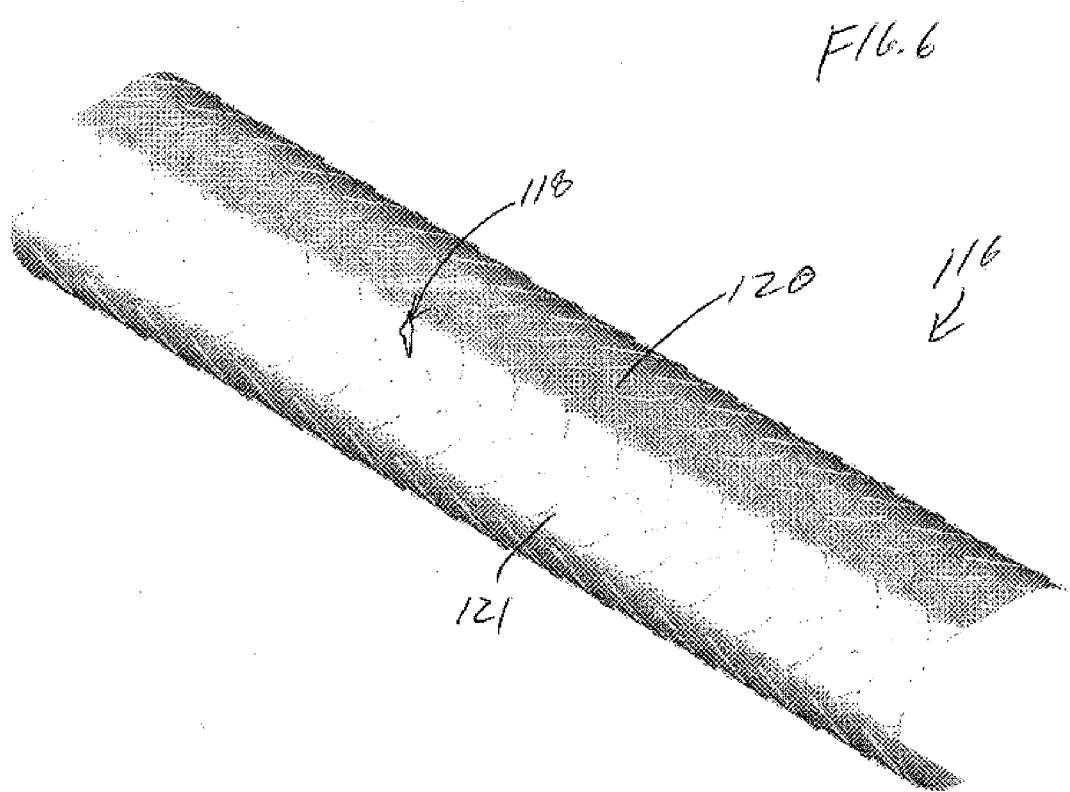

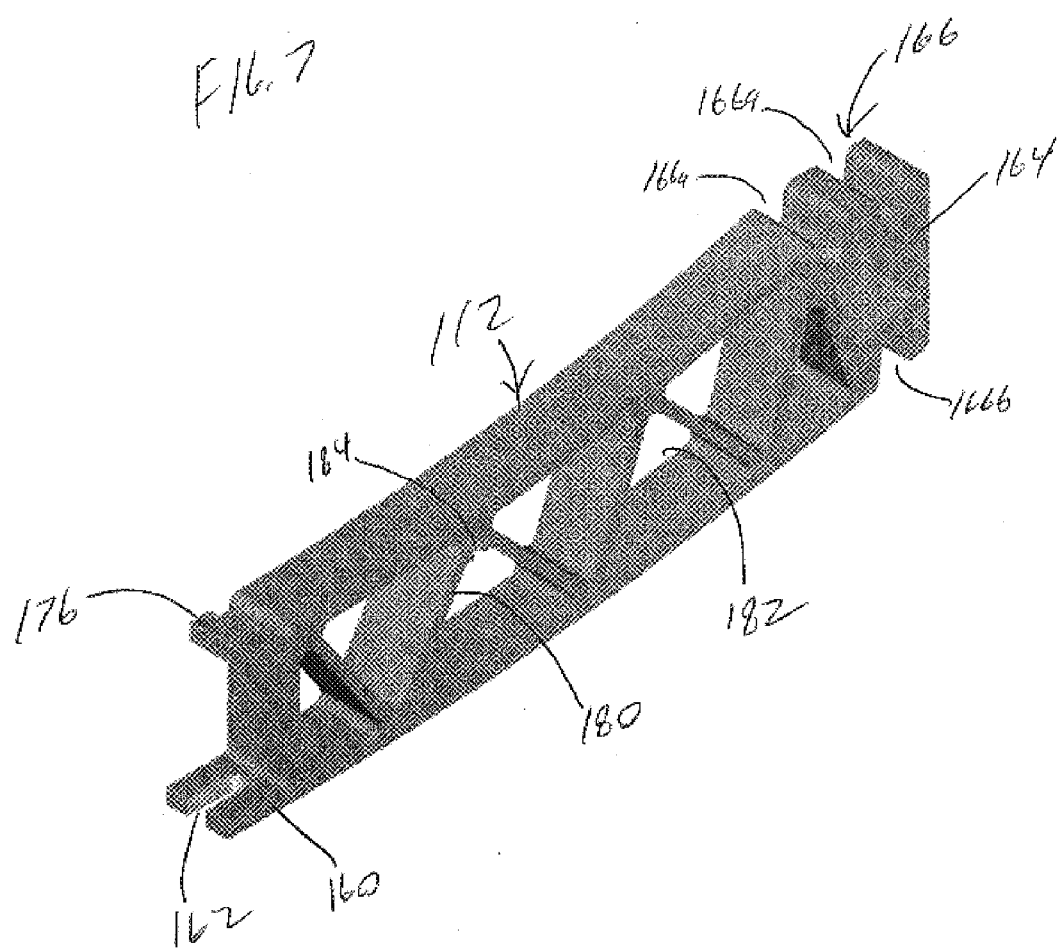

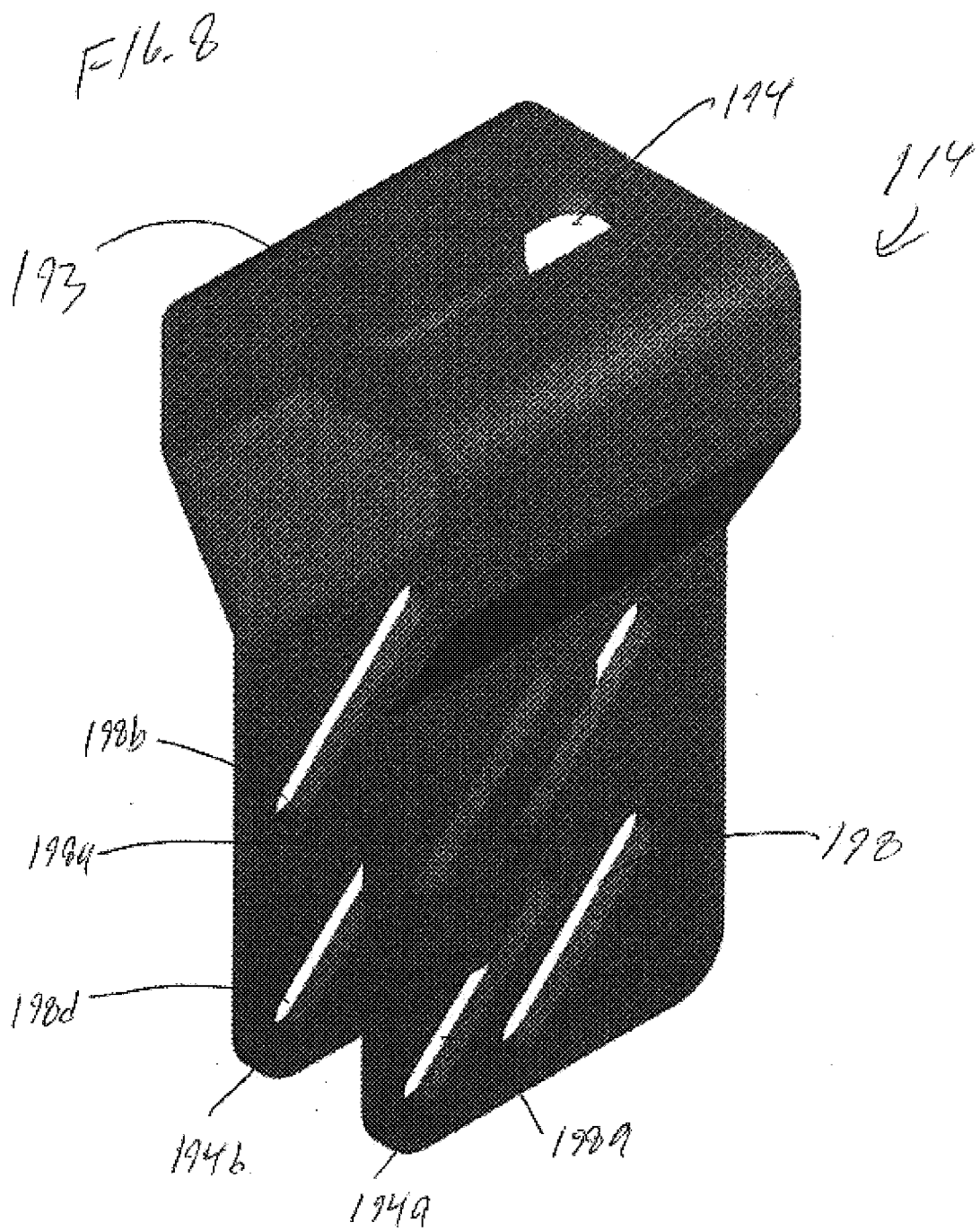

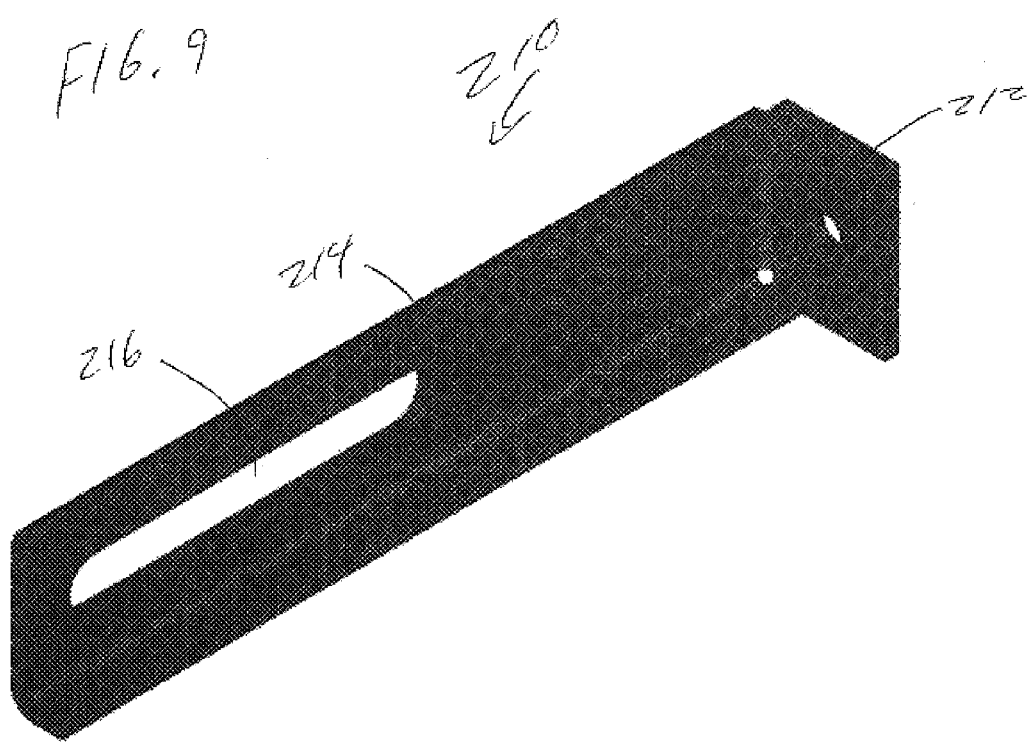

VEHICLE STEP

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

The present invention may be embodied in a variety of forms. In some embodiments the invention is directed to a vehicle side bar or step assembly for use on a vehicle, particularly on vehicles such as pick-up trucks, dump trucks, sport utility vehicles (SUVs), Jeeps, and other vehicles.

2. Background of the Invention

Many classes of vehicles are raised off the ground to an extent that may make it difficult to enter the vehicle cab or access portions of the vehicle. Such vehicles or trucks may be equipped with accessories such as externally mounted side boards, running boards, side bars, or other step assemblies to provide a surface upon which a person may step, and/or stand when attempting to access the cab or other portion of the vehicle.

Unfortunately, many of these known step assemblies suffer from design and/or structural inadequacies that limit their usefulness as steps or standing surfaces. In addition many step assemblies are not adjustable in position and may be difficult to properly install on a vehicle.

An example of a known step assembly comprises a substantially L-shaped running board that is mounted beneath the passenger cab of the vehicle. While such a running board may provide a relatively flat stepping surface, often times however running boards of this type are of a fairly flimsy construction that may lead to the running board being easily damaged through even normal use and which may fail to prevent or even limit rusting or other deterioration.

Many of the known types of step assemblies are constructed in such a manner so that the assembly can only be mounted in a single fixed position, that may even require drilling or other structural modification of the vehicle in order for the step to be properly mounted thereto. Because many known step assemblies are of a fixed size and shape a wide range of step sizes must be manufactured to accommodate the many models of trucks that may potentially utilize the assemblies. As a result, the manufacturing cost of such assemblies is dramatically increased even though ease of installation and use are limited. Moreover, the lack of adjustability in many step assemblies may lead to the step being mounted to close to the ground or to close to the truck resulting in the vehicle user not using the step as intended.

In addition to the above, many step assemblies are constructed of fairly thin metal and have a limited number of mounting points. Portions of the step that extend an appreciable distance from a mounting point, such as the end portions of some step assemblies, may have insufficient strength to support the weight of a person or persons standing or stepping thereon. As a result, the end portion(s) of such a step may bend or collapse when a person or people stand or step thereon. This problem is exacerbated in trucks having cargo beds or boxes where the box is intended to move independently of the cab when the truck is driven over rough terrain. As a result a step assembly cannot be attached to both the passenger cab and the truck box as the independent motion of the cab and box would be compromised. To avoid the problems of interfering with cab and box movements and the risk of step collapse, many step assemblies are simply provided in a relatively short length. There is a critical need to provide truck users with a step assembly that provides assistance in reaching into and/or climbing into the truck bed, and steps extending only the length of the passenger cab or less provide limited utility in meeting this need.

One common step design that is currently quite popular employs a relatively wide tubular bar that is attached to the vehicle at one or more points beneath the cab or passenger compartment. Because tubular step assemblies are often substantially round in cross section, the stepping surface provided by the step tube is limited if not precarious. To provide a surface that is both safer and easier to step or stand upon many tubular step assemblies are provided with pads or inserts that act as the stepping surface. Some examples of some prior tubular step assemblies having such modified surfaces are described in U.S. Pat. Nos. 6,409,193; 6,173,979; 5,713,589; 4,943,085 and 4,935,638.

A significant disadvantage to these types of tubular step assemblies is that often only a portion of the step, such as the portion directly beneath the cab door, is provided with the desired step surface. Such selective placement of the stepping surface limits the stepping utility of the assembly as a whole. In addition, the necessity of providing the tubular step with an insert or surface pad undesirably increases the cost of producing the assembly.

In light of the above, a need exists to provide a step assembly that is easily mounted to a vehicle; is fully adjustable;- has a substantially flat stepping surface; has sufficient strength to support one or more persons along its entire length, regardless of that length; and which is rugged enough to be used on trucks exposed to even the most demanding working and/or recreational environments.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

As indicated above the present invention is embodied in a variety of forms.

In at least one embodiment the invention is directed to a vehicle step assembly comprising a step support member. In some embodiments the metal step support is at least partially constructed from extruded aluminum. In some embodiments the step support includes one or more engagement grooves to which one or more mounting brackets, fasteners, and/or supports may be receivably and adjustably engaged.

In at least one embodiment the assembly includes a housing that is engaged to the step support. In some embodiments the housing is at least partially constructed from metal. In some embodiments the housing is at least partially constructed from one or more sheets of aluminum. In some embodiments the housing is engaged to the step support by welding. In some embodiments the aluminum housing defines a substantially flat stepping surface as well as a rounded or substantially semi-circular facing. In some embodiments the exposed surface of the housing is textured. In some embodiments the housing is constructed at least partially of textured sheet metal, such as diamond plate aluminum, that covers at least a portion of the step support.

In at least one embodiment the assembly includes at least one extension arm, or brace that is at a first end constructed and arranged to be removably and adjustably engaged to the step support and at a second end is constructed and arranged to be removably and adjustably engaged to a mounting bracket. In some embodiments the extension brace is at least partially constructed from metal. In some embodiments the extension brace is at least partially constructed from extruded aluminum. In some embodiments the extension brace is characterized as being webbed. A webbed brace comprises a plurality of interconnected struts that define a plurality of spaces along the length of the brace.

In at least one embodiment the assembly includes at least one mounting bracket or clevis. The clevis is constructed and arranged to be removably and adjustably mounted to a portion of a truck. The clevis comprises a pair of clevis arms that are constructed and arranged to be removably and adjustably engaged to the second end of an extension brace.

In at least one embodiment the assembly further comprises a torsion bar. In some embodiments the bar is substantially L-shaped. In some embodiments, along the length of the brace a slot is defined that is constructed and arranged to provide the bar with removable and adjustable engagement to an arm of the clevis. In some embodiments an end of the bar is constructed and arranged to abut a portion of the truck. In some embodiments the torsion bar comprises a biasing member In some embodiments the end of the bar may be fixedly and removably engaged to the portion of the truck.

In at least one embodiment the invention is directed to a vehicle having a step assembly, wherein the step assembly comprises a metal step support member, at least one extension arm, and a mounting bracket as described herein. In some embodiments the step assembly of the vehicle further comprises a housing at least partially covering the step support member. In some embodiments the housing provides at least one substantially horizontal portion and at least one substantially curved portion.

These and other embodiments which characterize the invention are pointed out with particularity in the claims annexed hereto and forming a part hereof. However, for a better understanding of the invention, its advantages and objectives obtained by its use, reference should be made to the drawings which form a further part hereof and the accompanying descriptive matter, in which there is illustrated and described a embodiments of the invention.

BRIEF DESCRIPTION OF THE SEVERAL VIEWS OF THE DRAWINGS

A detailed description of the invention is hereafter described with specific reference being made to the drawings.

FIG. 1 is a perspective view of an embodiment of the invention.

FIG. 2 is a perspective view of an embodiment of the invention.

DETAILED DESCRIPTION OF THE INVENTION

Figure 4:
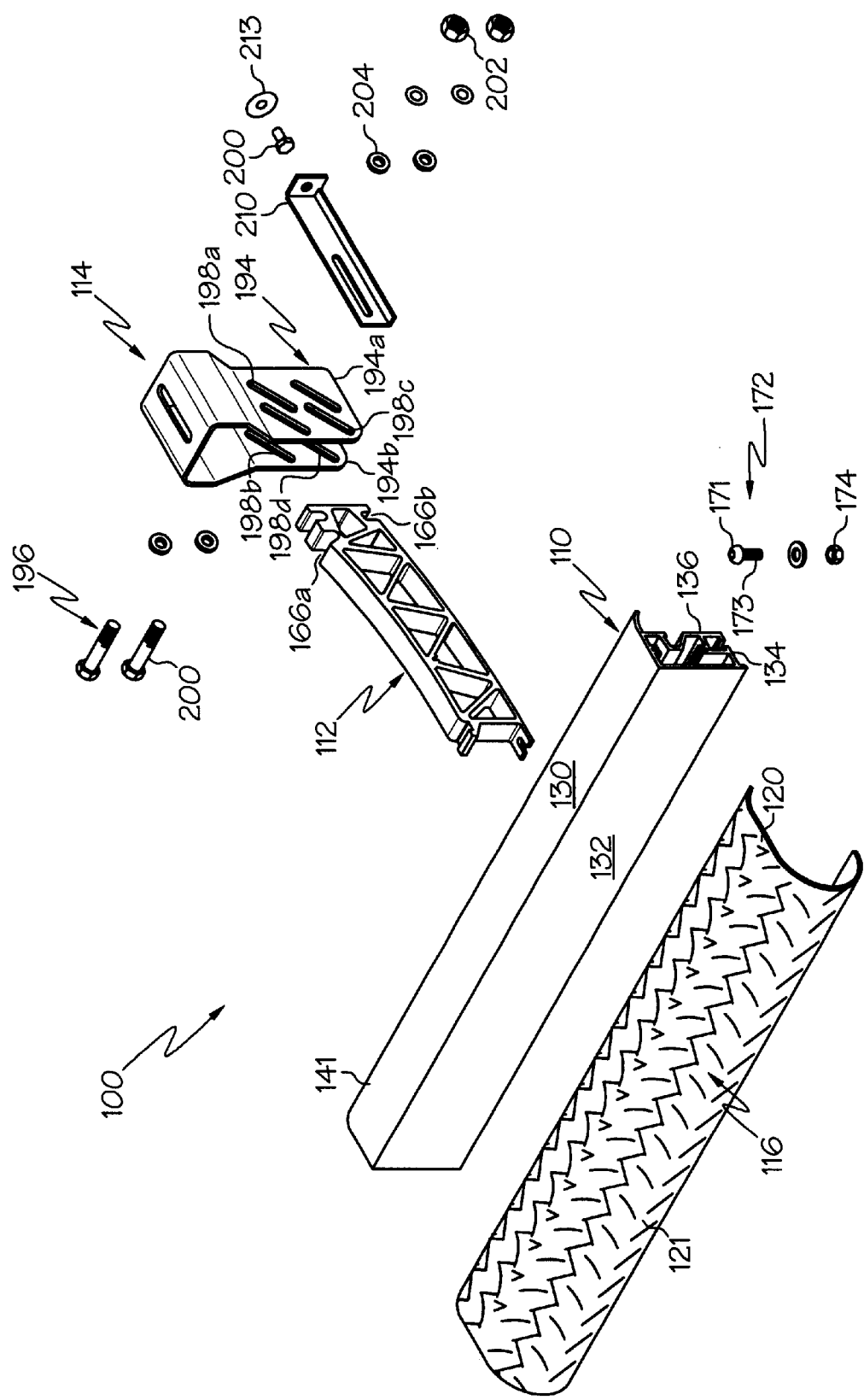
FIG. 4 is an exploded perspective view of an embodiment of the invention.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

As indicated above the present invention is directed to a variety of embodiments. For example, in an embodiment of the invention shown in FIG. 1 a vehicle, indicated generally at 10 is shown. Vehicle 10 may be any sort of vehicle, such as an open bed or box truck (pick-up), dump truck, SUV, Jeep or any other vehicle whose user may benefit from the addition of a step assembly 100 for stepping into, standing upon or in anyway accessing the vehicle 10 or a portion thereof.

In the embodiment shown in FIG. 1, the vehicle 10 is a pick-up truck having a passenger cab 12 and a box 14. Step assembly 100 may be provided with a step member 102 having any length desired in order to provide a user (not shown) with a stepping surface 104 that extends beneath any portion of one or both the cab 12 and box 14. The assembly 100 employs engagement mechanisms 106, at selected portions of the vehicle 10 which underlie the cab 12. Despite there being no direct engagement of the assembly 100 to the box 14, all portions of the step member 102, including those areas extending unsupported beneath the box 14, have sufficient structural integrity and strength to permit one or more users to step or even stand upon any portion of the stepping surface 104 without permanently bending or otherwise significantly harming the step member 102 or its stepping surface 104.

As is discussed in greater detail below, assembly 100 is provided with numerous unique features that allows the assembly 100 and its various components to be resistant to bending due to application of weight on to or against the assembly, deterioration from weather and normal wear and tear, and other potential causes of damage that a less substantial step assembly might otherwise be affected by.

Figure 3:
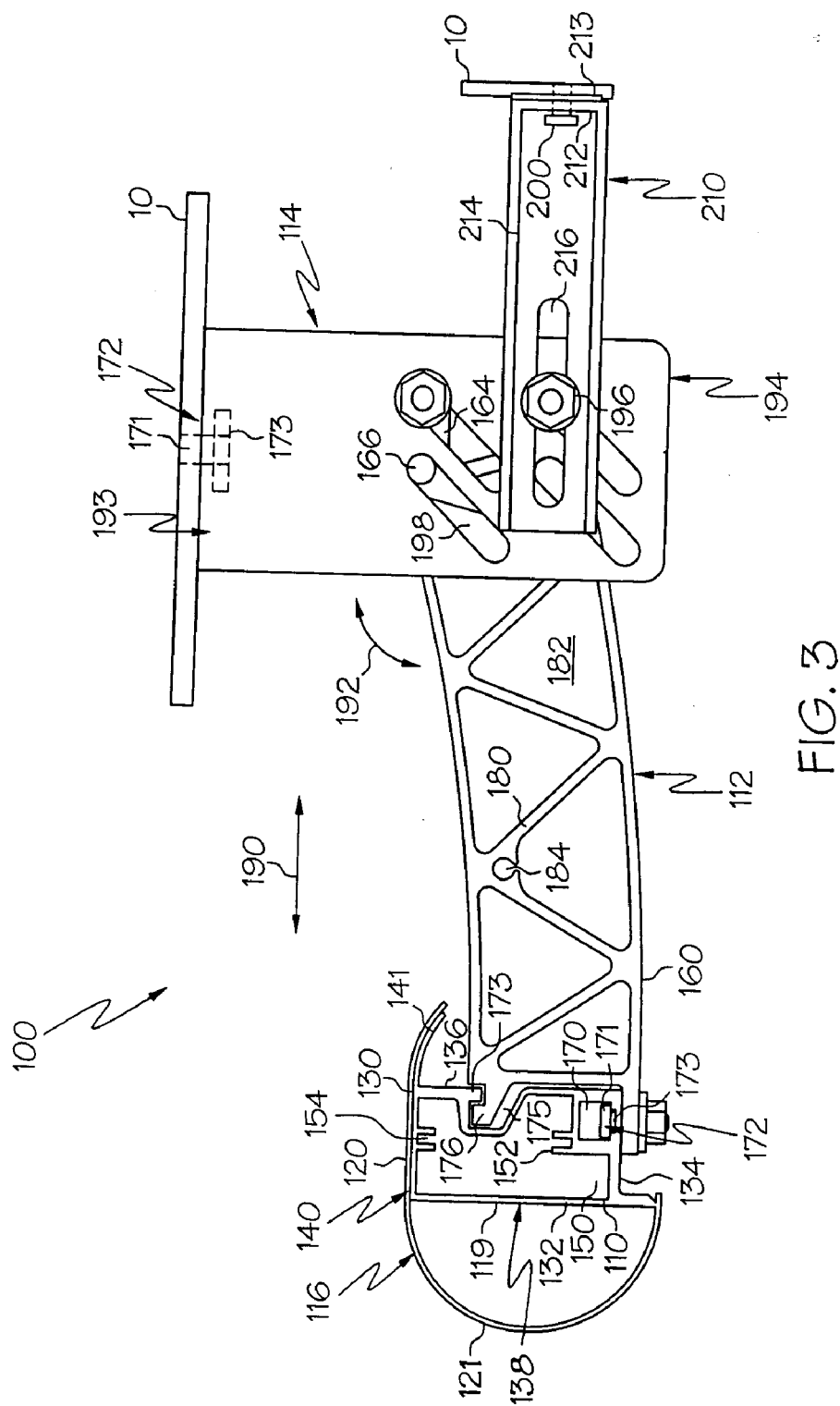
FIG. 3 is a side view of an embodiment of the invention.

In the embodiments shown in FIGS. 2 and 3, assembly 100 is shown in greater detail with an exploded view in FIG. 4 illustrating the manner of engagement between the various components of the completed assembly 100.

In at least one embodiment shown in FIGS. 2–4 the assembly 100 comprises a step support member 110, which is engaged to at least one extension arm or brace 112 and at least one mounting bracket 114. Bracket 114 is constructed and arranged to be engaged to the underside of the passenger cab or other portion of the vehicle 10 such as in the manner shown in FIG. 3.

Figure 5:
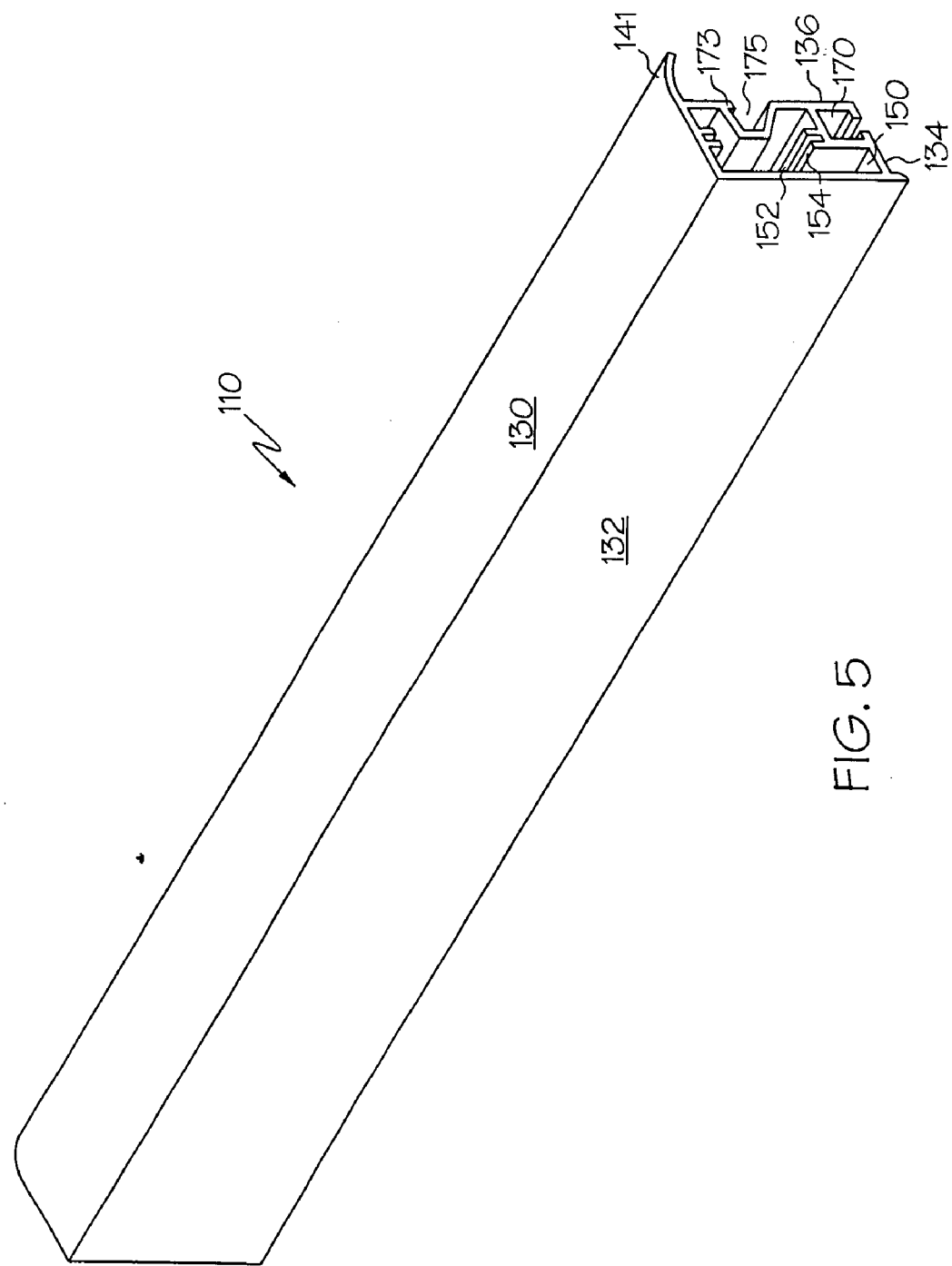
FIG. 5 is a perspective view of an embodiment of the invention.

In order to provide a step support member 110 that has one or more portions which extend beyond brace 112 and which are sufficiently strong to allow the weight of one or more persons to step or stand thereupon, the member 110 is a single continuous piece of formed metal such as aluminum, steel, titanium, etc. such as is shown in greater detail in FIG. 5. In at least one embodiment the member 110 is an extrusion of aluminum metal or an alloy thereof.

Figure 6:
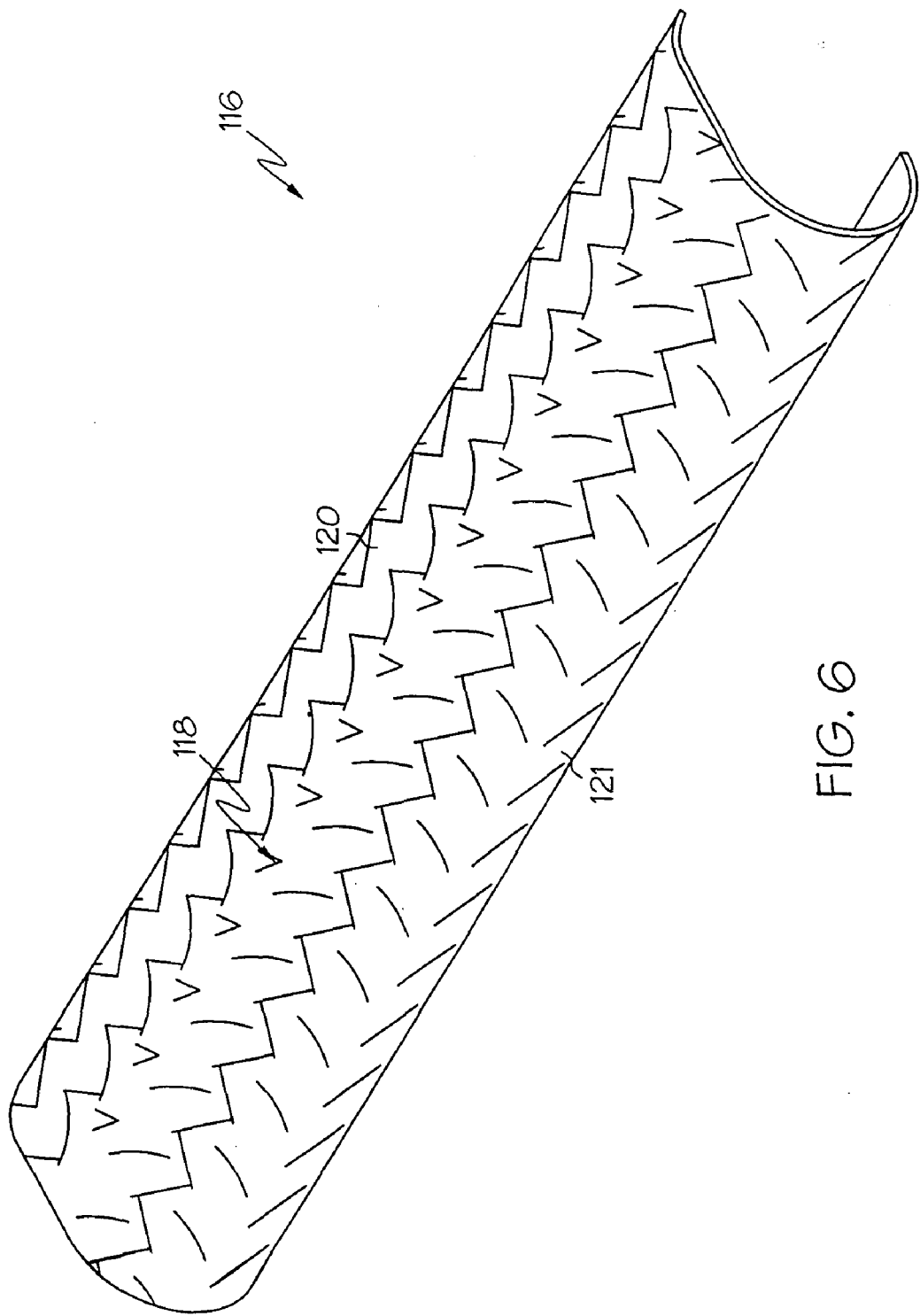
FIG. 6 is a perspective view of an embodiment of the invention.

In some embodiments of the invention such as are illustrated in FIGS. 1–4, a housing 116 is disposed at least partially about the step support member 110. The housing 116 may be of any material desired but in at least one embodiment, the housing 116 is one or more sheets of aluminum or other metal that is resistant to denting, weathering, corrosion and other incidental deterioration that the assembly may typically be exposed to. In at least one embodiment, such as is shown in FIG. 6 the housing 116 includes a textured pattern of raised surface features 118 that provides the assembly 100 with a slip resistant stepping surface 120. A commercially available form of aluminum sheet metal that includes such a textured pattern of raised surface features is known as diamond plate aluminum and is commercially available from Aluminum Company of America of Bettendorf, Iowa; Commonwealth Metals of Englewood Cliff, N.J.; and others. In an embodiment where the housing 116 is at least partially constructed of diamond plate aluminum, the raised surface features are substantially diamond shaped.

As is shown in FIGS. 2 and 3 the housing 116 may be engaged along one or more engagement surfaces or lines common with the step support member 110. In at least one embodiment the housing is tack welded to at least a portion of the top side 130 and/or bottom side 134 of the step support member 110.

As is shown in FIG. 2, in some embodiments of the invention the step support member 110 is provided with a shape such that when the assembly 100 is mounted to a vehicle 10 such as in the manner shown in FIG. 3, the support member 110 has at least one substantially vertical member 119 which provides the member 110 with even more improved bend and compression resistance. In the embodiment shown, the front side 132 of the member 110 is provided with a substantially flat vertical surface 138. As is shown in FIG. 3 when the assembly 100 is mounted to vehicle 10, at least a portion of the top side 130 of the member 110 defines a substantially flat horizontal surface 140.

In at least one embodiment at least a portion of the housing 116 is positioned over the surface 140 of the step support member 110 to provide the assembly 100 with a substantially horizontal textured stepping surface 120 that is between about 1 inch to about 8 inches in width through out at least a portion of the length of the assembly 100.

Because many users consider it desirable to provide vehicle steps with a tubular configuration or appearance, in at least some embodiments of the present invention, the housing 116 further defines a rounded face 121 which extend from the substantially horizontal textured stepping surface 120. The rounded face of the housing is disposed in an arc over the front side 132 of the step support member 110. The rounded face 121 provides the assembly 100 with a substantially tubular appearance when engaged to a vehicle 10 such as shown in FIG. 1. To enhance the tubular appearance of the assembly, in at least one embodiment the housing 116 further includes end cap regions 123 that are engaged to the ends of the housing 116 such as is shown in FIG. 1. End cap regions 123 are preferably constructed of the same material that the rest of the housing is constructed from. End cap regions 123 may be welded, frictionally engaged, or otherwise engaged to the ends of the housing 116.

In some embodiments, an example of which is shown in FIG. 5, the top side 130 of the step support member 110 also includes a curved portion 141. When the assembly is engaged to the vehicle 10 such as is shown in FIG. 3 the curved portion 141 extends from the substantially flat horizontal surface 140 toward the vehicle 10 and eventually curves downward toward the brace 112. In some embodiments the housing 116 is engaged to the curved portion 141.

In at least one embodiment the various sides: top side 130, front side 132, bottom side 134 and back side 136 of the step support member 110 define a substantially hollow chamber 150 that extends at least partially through the length of the step support member 110, such as is shown in FIGS. 2 and 3. Alternatively, the step support member 110 may be a substantially continuous bar of solid material. Where the member 110 defines a chamber 150, such as in the embodiment shown in FIG. 5, the member 110 may further comprise a plurality of slot members 152 that extend into the chamber 150 from the top side 130 and bottom side 134. Slot members 152 that extend from a give side of the member 110 define a support slot 154. Support slots 154 are positioned opposite one another. Support slots 154 are constructed and arranged to receive one or more vertical supports or struts that will provide the member 10 with even greater vertical support and strength should such strength be needed or desired.

As indicated above, in some embodiments of the invention, the step assembly 100 is adjustable relative to the vehicle 10. As used herein the term adjustable refers to the capability of various elements of the assembly 100, namely the step support member 110, the at least one brace 112, and the at least one bracket 114, and in some cases even the vehicle 10, to be adjustable in position relative to one another when the elements are engaged together to form the assembly 100.

In order to provide an adjustable engagement between the step support member 110 and at least one brace 112, such as is shown in FIGS. 2 and 3, both the brace 112 and the member 110 are provided with a variety of complimentary engagement surfaces and features which allow a first end 160 of the brace 112 to be adjustably and removably engaged to one or more of the bottom side 134 and back side 136 of the member 110.

Figure 7:
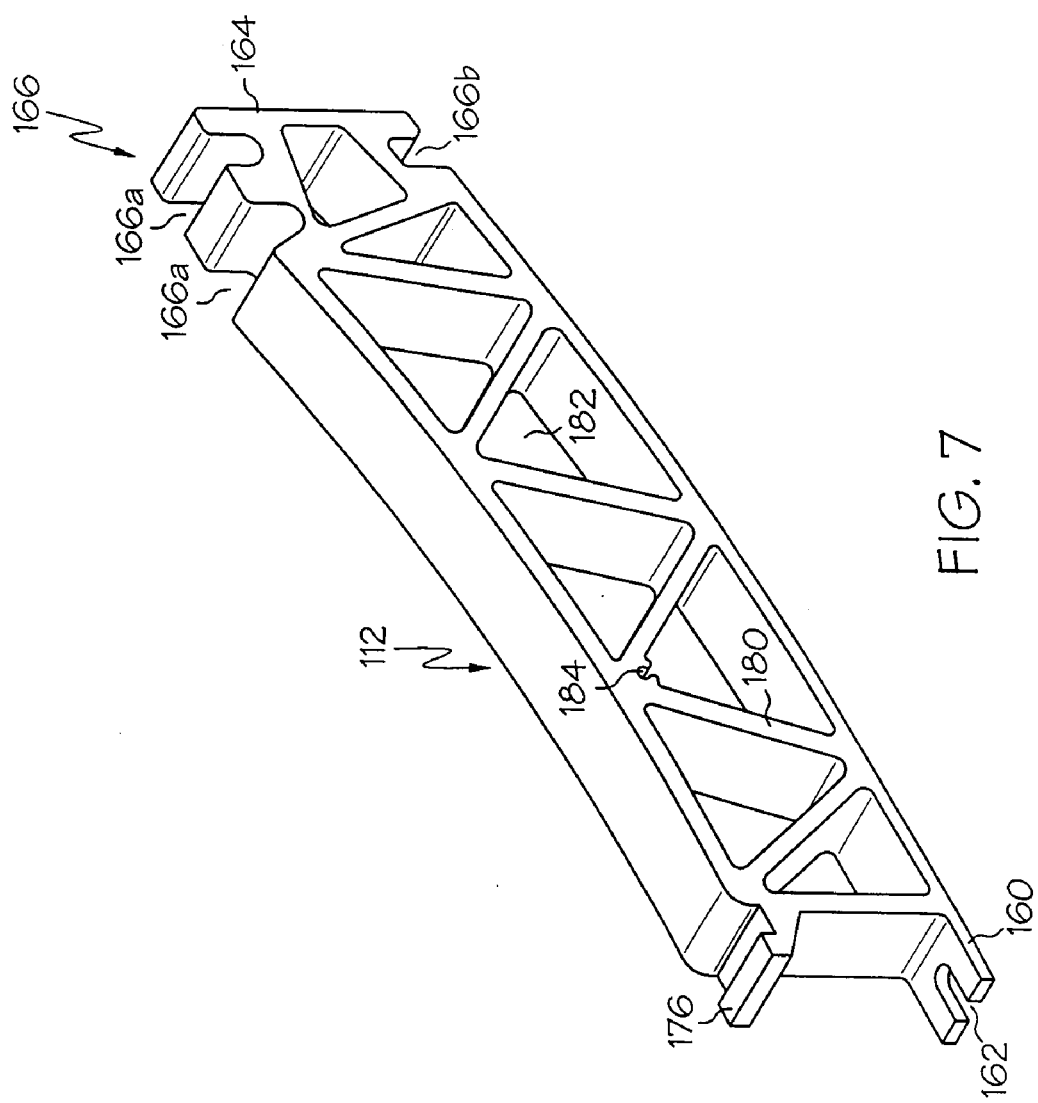
FIG. 7 is a perspective view of an embodiment of the invention.

In at least one embodiment of the invention the at least a portion of the bottom side 134 of the step support member 110 defines a fastener channel 170. Fastener channel 170 is constructed and arranged to receive and support a head 171 of a fastener 172 such as a bolt shown in FIGS. 3 and 4. The head 171 of the fastener is slideable throughout the length of the fastener channel 170. A lower portion 173 of the fastener 172 extends freely outward from the channel 170. The lower portion of the fastener 172 is constructed and arranged to engage a fastener opening 162 of the first end 160 of the brace 112, such as is shown in FIG. 7. In the embodiments shown in FIG. 4, the fastener 172 is a bolt. As is shown in FIG. 3, the lower portion 173 of the bolt 172 passes through the fastener opening 162 of the brace 112 whereupon the lower portion 173 is threadingly engaged to a nut 174 and at least one optional washer.

In at least one embodiment the first end 160 of the brace 112 defines a fastener opening 162 as a slot. In such an embodiment, as is shown in FIG. 7, the slot will provide a fastener engaged thereto with a significant amount of adjustment play. When the brace 112 is engaged to the step support member 110 via a fastener 172, the brace 112 and fastener 172 may be together adjustably moved in a lateral direction relative to the member 110. When a desired position is reached, the fastener 172 is tightened to fixedly secure the brace 112 and step support member 110 together.

In addition to the first end 160 of the brace 112 being adjustably and removably engageable along the bottom side 134 of the step support member 110, in some embodiments the first end 160 of the brace 112 is also constructed and arranged to adjustably and removably engage at least a portion of the back side 136 of the step support member 110.

As is shown in FIGS. 3 and 5, at least a portion of the back side 136 of the step support member 110 defines a snap-in channel 175. Snap-in channel 175 is constructed and arranged to receive and support an upwardly oriented engagement boss 176 of the first end 160 of the brace 112 such as in the manner shown in FIG. 3. The snap-in channel 175 is partially defined by a downwardly oriented engagement boss 173. When the first end 160 of the brace 112 is engaged to the bottom side 134 and backside 136 of the step support member 110 such as in the manner shown in FIG. 3, the downwardly oriented engagement boss 173 of the member 110 and the upwardly oriented engagement boss 176 of the first end 160 of the brace 112 cooperatively engage one another.

As a result of the unique relationship between the bottom side 134 and back side 136 of the step support member 110 with the first end 160 of the brace 112, when the brace 112 is engaged to the member 110 in the manners described above the position of the brace 112 relative to the step support member 110 is freely adjustable along the length of the step support member 110.

In addition to the unique aspects of the first end 160 of the brace 112, the brace 112 includes a variety of other features to enhance its performance in terms of strength as well as further adjustability. For example, in the embodiment shown in FIG. 7, a brace 112 is shown having a webbed configuration comprising a plurality of interconnected support members 180. The support members 180 define a plurality of spaces 182. Alternatively, brace 112 may be a solid bar of material or provided with a configuration other than that shown. However, by providing the brace with spaces 182 defines by members 180 the cost of producing the brace 112 is reduced as less material is required in its manufacture. It must be noted however, that by providing the brace 112 with the unique webbed pattern shown the supportive strength of the brace is not substantially reduced despite the reduction in material used.

In at least one embodiment the brace 112 is manufactured from metal. Like all of the various components of the invention brace 112 may be formed by any method desired, such as by extruding the material of the brace in the desired configuration shown and then cutting the extrudate into one or more braces of a desired thickness. Alternatively, the brace may be cut from a block of material, molded, etc.

In the embodiment shown in FIG. 7, the members 180 defines at least one support slot 184 that extends into at least one of the spaces 182. The support slot 184 may be utilized to receive one or more fasteners or vertical support members which may provide the brace 112 with even greater supportive strength.

As indicated above, the completed assembly 100 as shown in FIGS. 2 and 3 is adjustable in a variety of different manners. Not only is the brace 112 slidingly adjustable relative to the step support member 110, but in some embodiments the brace 112 is also capable of being adjusted relative to the bracket 114. In these embodiments, when the bracket 114 is engaged to the vehicle 10 such as is shown in FIG. 3, the position of the brace 112 may be adjusted in an outward and inward direction relative to the vehicle 10 such as indicated by arrows 190. In some embodiments, the angular position of the brace 112 may be adjusted relative to the bracket 114 such as indicated by arrows 192.

To provide the brace 112, and the assembly 100 as a whole, with the degree of adjustability described above, some embodiments of the invention employ a brace 112 having a second end 164 that uniquely engages the arms 194 of the bracket 114 and adjustable support fasteners 196 such as are shown in FIGS. 2 and 3.

Figure 8:
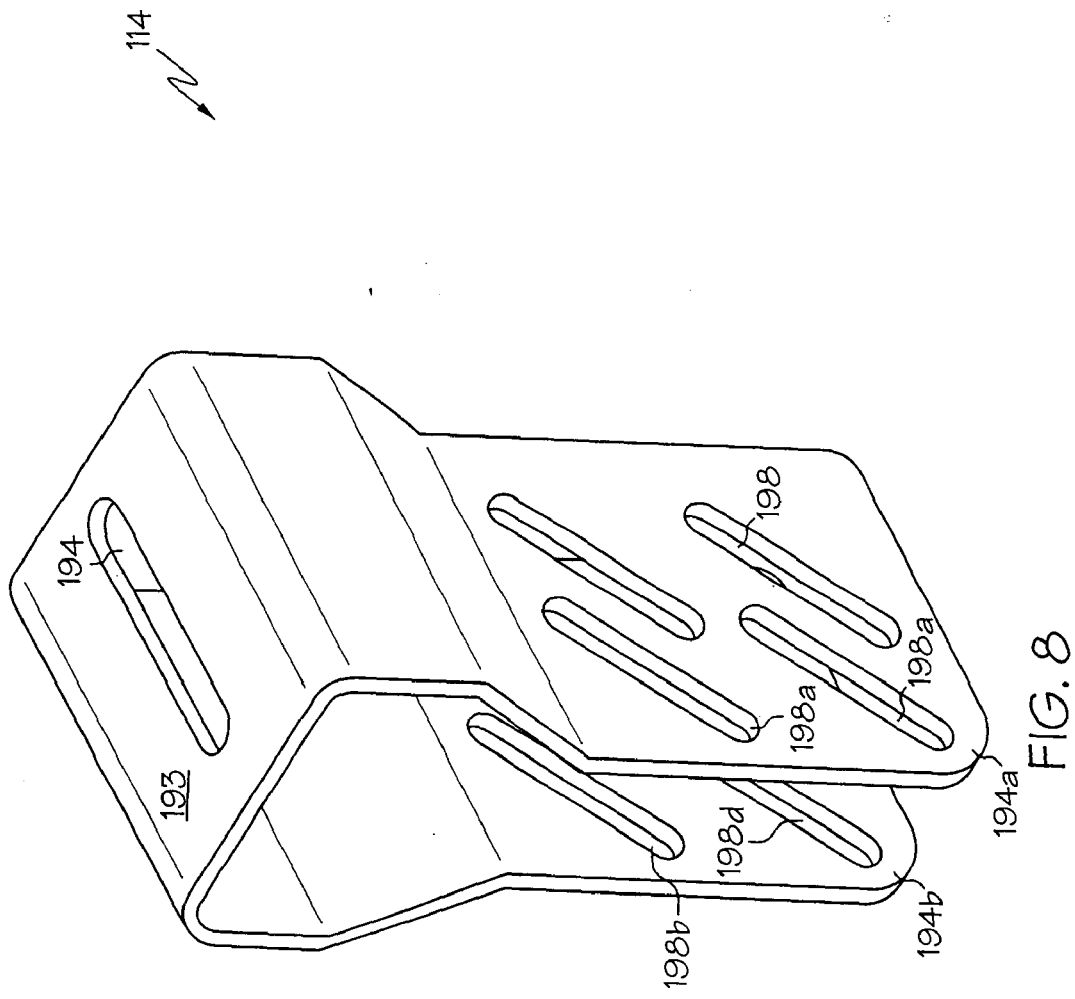
FIG. 8 is a perspective view of an embodiment of the invention.
Figure 9:
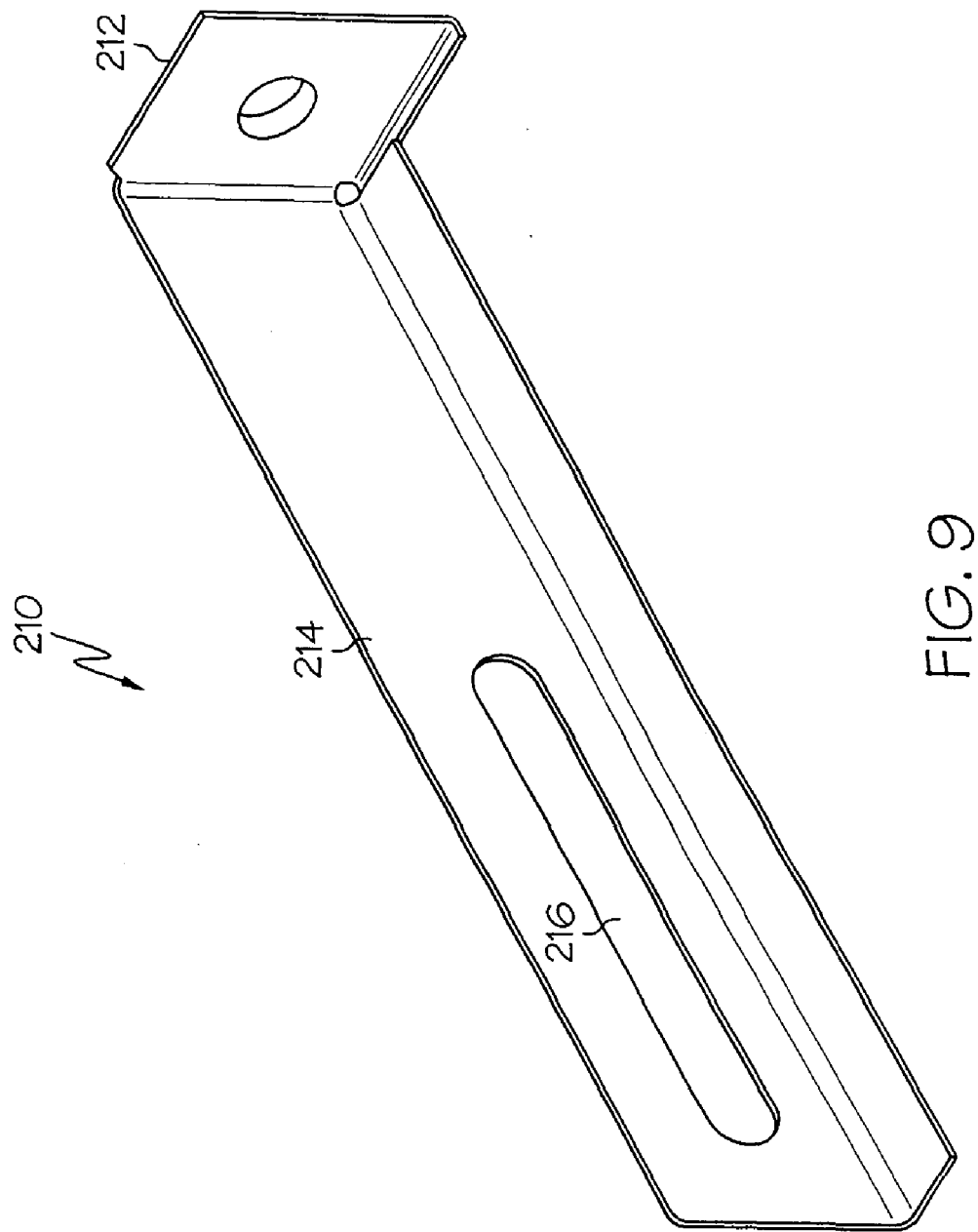
FIG. 9 is a perspective view of an embodiment of the invention.

Bracket 114 such as is shown in FIG. 8 is a clevis device that includes two opposite arms 194a and 194b that extend from a base member 193. Base member 193, defines an engagement slot 195 through which the lower portion 173 of at least one fastener 172 is passed to engage a substantially horizontal surface of the vehicle 10, such as is shown in FIG. 3. The head of the fastener 171 is larger than the slot 195. When the lower portion 173 of the fastener 172 is engaged to the vehicle 10 the head 171 pulls the bracket base member 193 against the vehicle 10.

In some embodiments the slot 195 is elongated to allow the base member 193 and thus the entire assembly to be adjustably positioned relative to the fastener 172 and vehicle 10 when the fastener is loosened or removed.

Turning to FIG. 7, the embodiment of the brace 112 presently shown includes a second end 164 which defines a plurality of fastener grooves 166. The second end 164 of the brace comprises at least one upper fastener groove 166a and at least one lower fastener groove 166b. In at least one embodiment, end 164 defines at least two upper fastener grooves 166a.

As is shown in FIGS. 2–3, the grooves 166 of the second end 164 of the brace 112, are positioned such that when the second end 164 of the brace 112 is positioned between the arms 194a and 194b of the bracket 114, the grooves 166 line up with the positions of correspondingly positioned slots 198 opposingly positioned in each of the bracket arms 194a and 194b.

As is best shown in FIG. 4, a particular manner of engaging the brace 112 to the bracket 114 comprises lining up at least one upper groove 166a between the arms 194 so that the groove 166a defines a passageway extending through at least one first upper slot 198a as defined by a first arm 194a of the bracket 114, and at least one second upper slot 198b as defined by a second arm 194b of the bracket 114. Additionally, when the second end 164 of the brace 112 is positioned between the arms 194a and 194b of the bracket 114, the at least one lower groove 166b also defines a passageway that extends through at least one first lower slot 198c as defined by a first arm 194a of the bracket 114, and at least one second lower slot 198d as defined by a second arm 194b of the bracket 114.

Once the brace 112 and bracket 114 are positioned in the manner desired, a support fastener 196 is inserted through the passageway defined by the at least one upper groove 166a, at least one first upper slot 198a and the at least one second upper slot 198b. A second support fastener 196 is inserted through the passageway defined by the at least one lower groove 166b, the at least one first lower slot 198c and the at least one second lower slot 198d.

In at least one embodiment, an example of which is shown in FIG. 8, the bracket 114 defines a plurality of slots 198 in each arm 194a and 194b. By aligning the grooves 166 of the brace 112 with different slots, and then securing the brace 112 to the bracket 114 with support fasteners 196, the position of the brace 112 relative to the bracket 116 may be changed. In this manner the relative position of the step support member 110 in the completed assembly 100, such as is shown in FIG. 3, can be moved outward from or inward toward the vehicle 10 with minimal effort as indicated by arrows 190.

In addition, by providing the brace 112 with grooves 166 having a predetermined depth, the angular position of the brace 112 may be adjusted by engaging the grooves 166 at various depth positions with the support fasteners 196.

As is shown in FIG. 4, in at least one embodiment each support fastener 196 comprises a bolt 200, a nut 202 and at least one optional washer 204.

Because the stability and strength of the assembly 100 are of significant importance to most users, in some embodiments of the invention the assembly 100 further includes an adjustable torsion bar 210 such as is shown in FIGS. 2–4 and 9. Torsion bar 210 is constructed and arranged to engage at least one arm 194a or 194b of the bracket 114 to the vehicle 10. In at least one embodiment the torsion bar 210 is a substantially L-shaped device having a base member 212 and an elongate side member 214. Base member is constructed and arranged to be engaged to a portion of the vehicle 10 adjacent to the assembly 100 such as is shown in FIG. 3.

The base member 212 may be engaged to the vehicle 10 in any manner desired. In at least one embodiment the base member 212 is fastened to a portion of the vehicle 10 with a fastener, such as a bolt 200, that is passed through the base member 212 and engaged to the vehicle 10 such as is shown in FIG. 3.

In some embodiments the base member 212 remains unfastened to the vehicle 10 but is frictionally engaged thereto to provide a bias between the bracket 114 and the vehicle 10. In such an embodiment the base member 212 preferably includes a protective member or separator device 213 such as a washer or fastener (such as is shown in FIG. 4) that prevents direct contact of the base member 212 and the vehicle 10, thereby preventing squeaking or other negative affects that may otherwise result when the base member 212 is in direct contact with the vehicle 10. The device 213 is constructed of a material that is softer than the portion of the vehicle 10 to which it is engaged, however, the device 213 should also be resistant to the compressive forces that may exist between the bar 114 and the vehicle 10 when the assembly 100 is in use. Some examples of materials suitable for use as separator 213 are certain fairly rigid plastics, synthetic and natural rubbers, etc.

The elongate side member 214 defines an elongate adjustment slot 216 through which one or more of the support fasteners 196 may be passed through, thereby engaging the torsion bar 210 to the bracket 114. When the bar 210 is engaged to the bracket 114 in this manner, the bar 210 acts to brace the assembly 100 to the vehicle 10 to reduce vibration and other movement of the assembly when in use including inward movement of the lower portion of the bracket 114, thereby providing a fairly rigid horizontal step when significant weight is placed on surface 104 as shown in FIGS. 1 and 2.

The adjustment slot 216 provides the bar 210 with the ability to be repositioned relative to the bracket 114. Such adjustability allows the bar to be adjustably repositioned to engage any surface of the vehicle adjacent to the bracket 114. In at least one embodiment the torsion bar 210 and the bracket 114 are individually at least partially constructed from one or more materials such as steel, aluminum, titanium, plastic, carbon fiber and/or combinations thereof.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

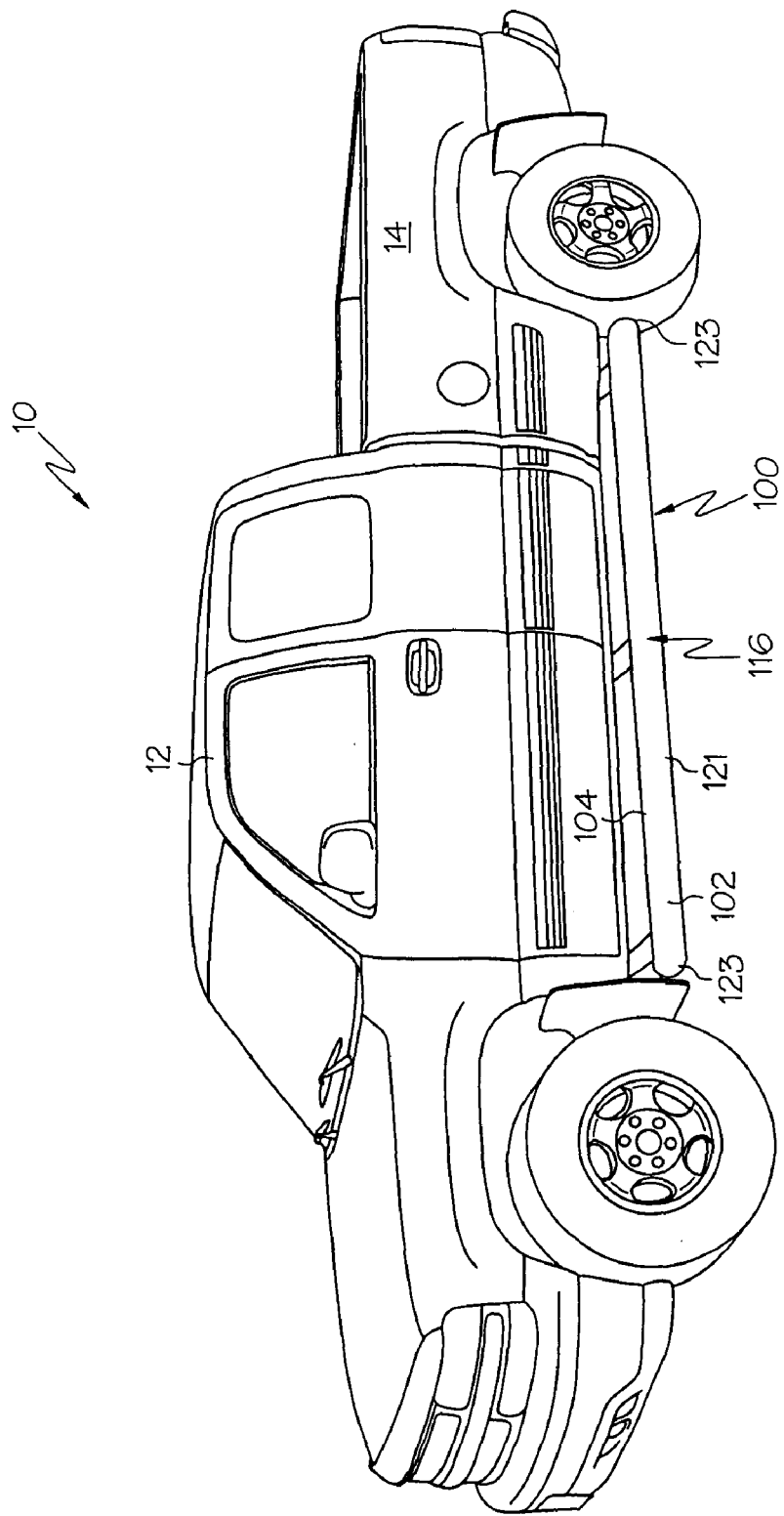

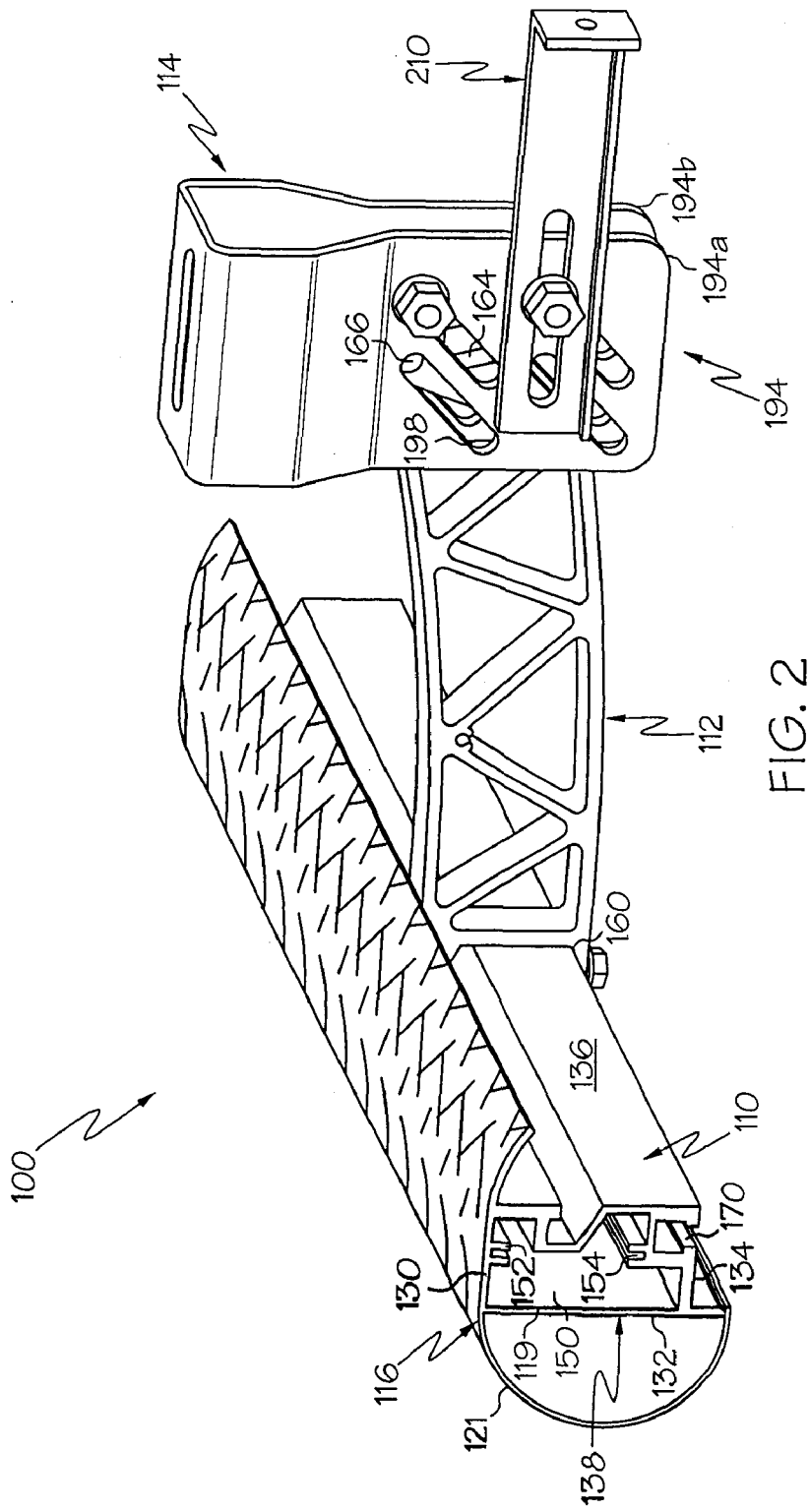

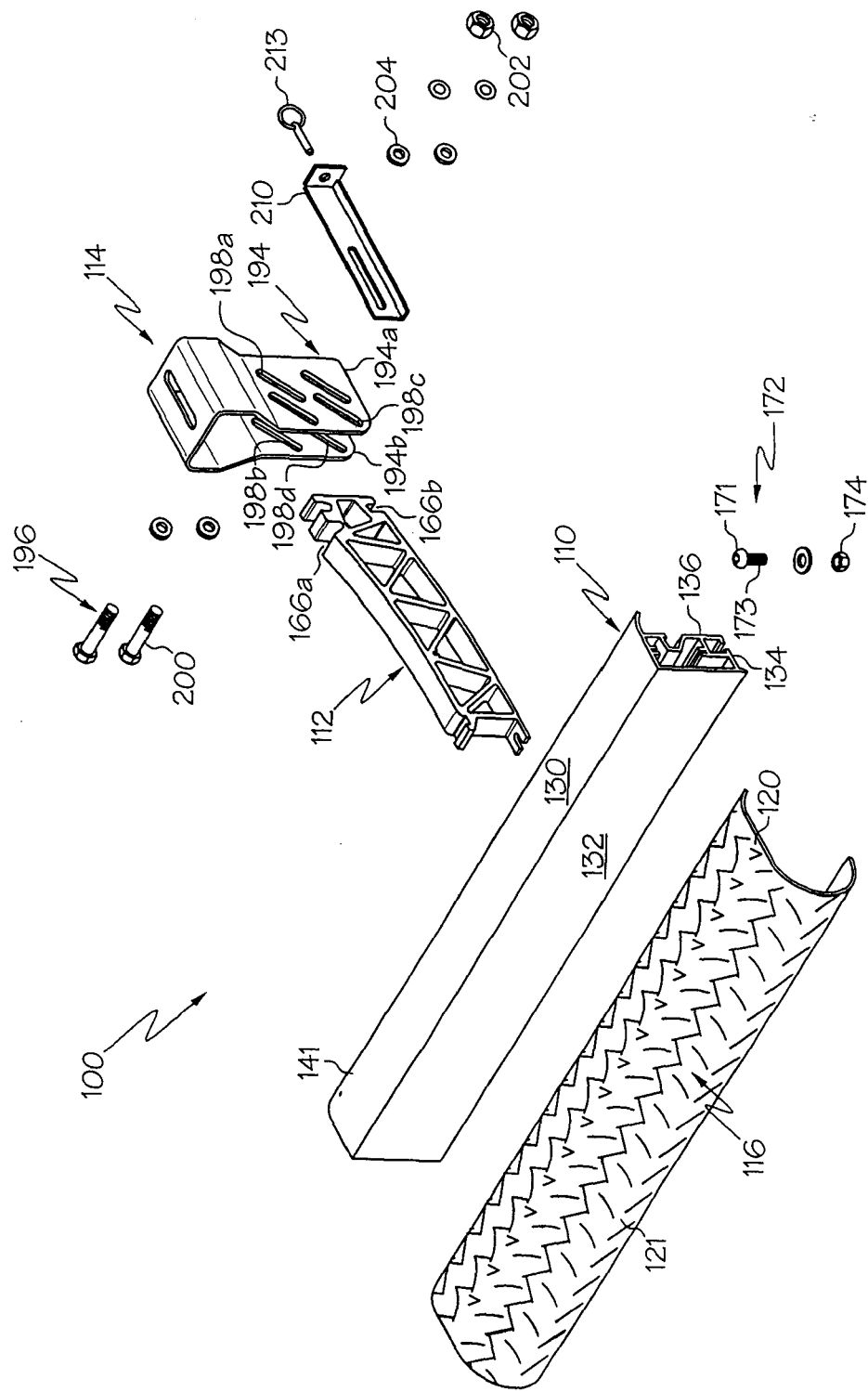

What is claimed is:

1. A step assembly for use on a vehicle, the step assembly comprising:
    an elongate step support member, the elongate support member defining a top side, a bottom side, a front side and a back side, at least a portion of the top side defining a substantially flat surface, a portion of the bottom side defining at least one fastener channel, the at least one fastener channel constructed and arranged to supportively engage a first portion of at least one fastener when the first portion of the at least one fastener is engaged to the fastener channel a second portion of the at least one fastener extends downward from the fastener channel;
    at least one mounting bracket, the at least one mounting bracket having a base and a pair of arms extending therefrom, the base being constructed and arranged to engage a portion of a vehicle; and
    at least one brace, the at least one brace comprising a first end region and a second end region, the first end region being adjustably and removably engaged to the elongate step support member, the second end region being adjustably and removably engaged to the pair of arms of the at least one mounting bracket, a portion of the back side of the elongate step support member defining an engagement channel, the engagement channel constructed and arranged to engage an upper portion of the first end of the at least one brace.

2. The step assembly of claim 1 further comprising a housing, the housing comprising at least one sheet of material at least partially disposed about the elongate step support member.

3. The step assembly of claim 1 wherein the top side of the elongate step support member further comprises a curved region the curved region extending from the substantially flat region and toward the at least one brace.

4. The step assembly of claim 1 wherein the front side of the elongate step support member defines a surface that is substantially flat, when the step assembly is mounted to the vehicle the substantially flat surface is substantially vertical.

5. The step assembly of claim 1 wherein a lower portion of the first end region of the at least one brace defines a fastener receiving region, the second portion of the at least one fastener being receivably engaged to the fastener receiving region.

6. The step assembly of claim 1 wherein the engagement channel comprises a downwardly oriented boss and the upper portion of the first end of the at least one brace comprises an upwardly oriented boss, when the engagement channel is engaged to the upper portion of the first end of the at least one brace the downwardly oriented boss is engaged to the upwardly oriented boss.

7. The step assembly of claim 1 wherein the elongate step support member further defines a substantially hollow chamber.

8. The step assembly of claim 1 wherein the at least one brace further comprises a plurality of interconnected strut members.

9. The step assembly of claim 1 wherein the second end region of the at least one brace defines a plurality of fastener spaces.

10. The step assembly of claim 1 wherein the base of the at least one mounting bracket defines at least one elongate slot, the at least one elongate slot being sized to receive at least one fastener therethrough, the at least one fastener engaged to the vehicle.

11. The step assembly of claim 1 further comprising at least one torsion bar, the at least one torsion bar having a base member and an elongate arm member, the elongate arm member being engaged to the at least one mounting bracket, the base member constructed and arranged to be engaged to the vehicle.

12. The step assembly of claim 1 wherein the elongate step support member is constructed from extruded aluminum.

13. The step assembly of claim 1 wherein the at least one brace is constructed from extruded aluminum.

14. The step assembly of claim 2 wherein the at least one sheet of material comprises a first portion and a second portion, the first portion defining a substantially flat stepping region that overlays the substantially flat surface of the top side of the elongate step support member, the second portion defines a substantially rounded region that extends from the first portion and outwardly over the front side of the elongate step support member, the rounded region being engaged to at least a portion of the bottom side of the elongate step support member.

15. The step assembly of claim 2 wherein the housing is engaged to at least a portion of the elongate support member by welding.

16. The step assembly of claim 5 wherein the at least one fastener is at least one bolt, the lower portion of the first end region of the at least one brace being engaged to the bottom side of the elongate step support member in a nut and bolt relationship.

17. The step assembly of claim 6 wherein the at least one fastener is slidably adjustable within the at least one fastener channel, and the upper portion of the first end of the at least one brace is slidably adjustable within the engagement channel.

18. The step assembly of claim 7 wherein the elongate step support member further defines at least one upper support channel and at least one lower support channel, the at least one upper support channel being defined by a pair of vertical members extending a predetermined distance into the substantially hollow chamber from the top side of the elongate step support member, the at least one lower support channel being defined by a pair of vertical members extending a predetermined distance into the substantially hollow chamber from the bottom side of the elongate step support member.

19. The step assembly of claim 8 wherein the plurality of interconnected strut members define a plurality of spaces.

20. The step assembly of claim 9 wherein each fastener space is a groove.

21. The step assembly of claim 9 wherein each arm of the at least one mounting bracket defines a plurality of slots, the slots of each arm being of similar dimensions and orientation and being positioned substantially opposite one from the other.

22. The step assembly of claim 10 wherein the position of the at least one mounting bracket is adjustable relative to the fastener.

23. The step assembly of claim 11 wherein the elongate arm member is removably and adjustably engaged to the at least one mounting bracket.

24. The step assembly of claim 11 wherein the elongate arm member is biasedly engaged between the at least one mounting bracket and the vehicle.

25. The step assembly of claim 14 wherein the housing provides the step assembly with a substantially tubular appearance when the step assembly is viewed from the front side of the elongate step support member.

26. The step assembly of claim 14 wherein the elongate step support member further defines a first end and a second end, the housing further comprising at least one end cap positioned over at least one of the first end and second end, at least a portion of the at least one end cap being engaged to the at least one sheet of material and extending outwardly from the at least one sheet of material and over the at least one of the first end and second end of the elongate support member.

27. The step assembly of claim 14 wherein the at least one sheet of material is at least partially constructed from aluminum.

28. The step assembly of claim 14 wherein the at least one sheet of material defines a slip resist surface.

29. The step assembly of claim 14 wherein the substantially flat stepping region of the first portion of the housing has a width of about 1 inch to about 6 inches.

30. The step assembly of claim 14 wherein the first portion of the housing further defines a curved region, the curved region extending from the substantially flat stepping region and toward the at least one brace.

31. The step assembly of claim 18 wherein the at least one upper support channel and the at least one lower support channel are positioned vertically opposite one to the other.

32. The step assembly of claim 19 wherein each space is substantially triangular in shape.

33. The step assembly of claim 19 wherein at least two adjacent strut members define at least one brace support channel, the at least one brace support channel constructed and arrange to receive an end of at least one vertical support.

34. The step assembly of claim 20 wherein the second end region of the at least one brace defines at least one upper groove and at least one lower groove.

35. The step assembly of claim 21 wherein at least one of the slots corresponds to the position of at least one of the fastener spaces, at least one fastener extending through the at least one of the slots and the correspondingly positioned at least one of the fastener spaces.

36. The step assembly of claim 23 wherein the elongate arm defines an adjustment slot, at least one fastener being engaged to the elongate arm and the at least one mounting bracket through the adjustment slot.

37. The step assembly of claim 28 wherein the slip resistant surface comprises a repeating pattern of raised surface features.

38. The step assembly of claim 31 wherein the at least one upper support channel and the at least one lower support channel are constructed and arranged to mutually engage at least one support member.

39. The step assembly of claim 35 wherein the at least one fastener is a bolt, the second end of the at least one brace and the arms of the at least one mounting bracket are engaged one to the other in a nut and bolt arrangement.

40. The step assembly of claim 37 wherein each raised surface feature is substantially diamond shaped.

41. A step assembly for use on a vehicle, the step assembly comprising:

an elongate step support member, the elongate support member defining a top side, a bottom side, a front side and a back side, at least a portion of the top side defining a substantially flat surface;

at least one mounting bracket, the at least one mounting bracket having a base and a pair of arms extending therefrom, each arm of the at least one mounting bracket defining a plurality of slots, the slots of each arm being of similar dimensions and orientation and being positioned substantially opposite one from the other, the base being constructed and arranged to engage a portion of a vehicle; and at least one brace, the at least one brace comprising a first end region and a second end region, the first end region being adjustably and removably engaged to the elongate step support member, the second end region being adjustably and removably engaged to the pair of arms of the at least one mounting bracket, the second end region of the at least one brace defining a plurality of fastener spaces.

* * * * *

UNITED STATES PATENT AND TRADEMARK OFFICE
CERTIFICATE OF CORRECTION

PATENT NO. : 6,742,793 B2
DATED : June 1, 2004
INVENTOR(S) : Gary R. Henriksen

It is certified that error appears in the above-identified patent and that said Letters Patent is hereby corrected as shown below:

The title page, showing the illustrative figures, should be deleted and substitute therefore the attached title page.

The drawing sheets consisting of Figs. 1- 9 should be deleted to be replaced with the drawing sheets, consisting of Figs. 1 - 9, as shown on the attached pages.

Signed and Sealed this

Twenty-fourth Day of August, 2004

JON W. DUDAS
*Director of the United States Patent and Trademark Office*

(12) United States Patent
Henriksen et al.

(10) Patent No.: US 6,742,793 B2
(45) Date of Patent: Jun. 1, 2004

(54) VEHICLE STEP

(75) Inventors: Gary R. Henriksen, Lakeville, MN (US); Todd W. Slawson, Eden Prairie, MN (US); Aaron P. Schmidt, Maple Grove, MN (US); Timothy A. Moore, Park Rapids, MN (US)

(73) Assignee: JMX, Inc., Minneapolis, MN (US)

( * ) Notice: Subject to any disclaimer, the term of this patent is extended or adjusted under 35 U.S.C. 154(b) by 43 days.

(21) Appl. No.: 10/229,455

(22) Filed: Aug. 28, 2002

(65) Prior Publication Data

US 2004/0041363 A1 Mar. 4, 2004

(51) Int. Cl.[7] ................................................. B60R 3/00
(52) U.S. Cl. ........................................ 280/163; 280/169
(58) Field of Search .............................. 280/163, 164.1, 280/166, 169; 296/183, 62, 75

(56) References Cited

U.S. PATENT DOCUMENTS

| | | | | |
|---|---|---|---|---|
| 3,561,786 A | * | 2/1971 | Lentz | 280/166 |
| 4,203,611 A | * | 5/1980 | Makela | 280/163 |
| 4,451,063 A | * | 5/1984 | Snyder | 280/163 |
| 4,456,275 A | * | 6/1984 | Snyder et al. | 280/163 |
| 4,935,638 A | | 6/1990 | Straka | 280/164.1 |
| 4,943,085 A | | 7/1990 | Straka | 280/770 |
| 4,982,974 A | * | 1/1991 | Guidry | 280/164.2 |
| 5,193,829 A | * | 3/1993 | Holloway et al. | 280/163 |
| 5,286,049 A | * | 2/1994 | Khan | 280/163 |
| 5,382,035 A | * | 1/1995 | Waddington et al. | 280/169 |
| 5,501,475 A | * | 3/1996 | Bundy | 280/166 |
| 5,601,300 A | * | 2/1997 | Fink et al. | 280/166 |
| 5,713,589 A | | 2/1998 | Delgado et al. | 280/163 |
| 5,769,439 A | * | 6/1998 | Thompson | 280/163 |
| 5,799,962 A | * | 9/1998 | Barnhart | 280/166 |
| 5,823,553 A | * | 10/1998 | Thompson | 280/164.1 |
| 5,895,064 A | * | 4/1999 | Laubach | 280/163 |
| 6,173,979 B1 | | 1/2001 | Bernard | 280/163 |
| 6,409,193 B2 | | 6/2002 | Bernard | 280/163 |

OTHER PUBLICATIONS

Advertising for Grissly 4000 Series Diamond Step Pad.
Brochure: Westin New Products for 2002, Westin Automotive Products, Inc.

* cited by examiner

*Primary Examiner*—Brian L. Johnson
*Assistant Examiner*—Bridget Avery
(74) *Attorney, Agent, or Firm*—Vidas, Arrett & Steinkraus, P.A.

(57) ABSTRACT

A step assembly for use on a vehicle comprises an elongate step support member, at least one mounting bracket and at least one brace. The support member defines a top side having a substantially flat surface. The at least one mounting bracket has a base and a pair of arms extending therefrom. The base is constructed and arranged to engage a portion of a vehicle. The at least one brace comprises a first end region and a second end region. The first end region is adjustably and removably engaged to the elongate step support member. The second end region is adjustably and removably engaged to the pair of arms of the at least one mounting bracket.

41 Claims, 9 Drawing Sheets

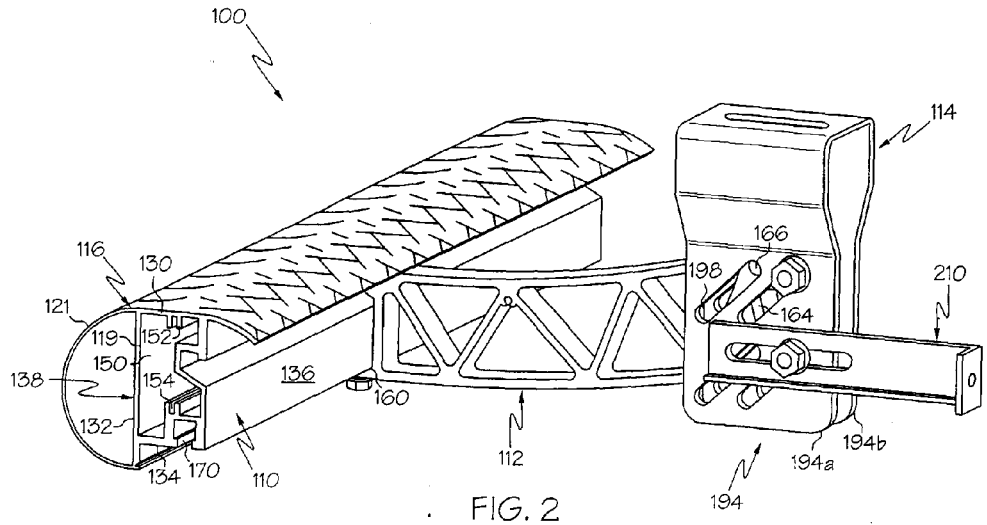

FIG. 2